US010078637B2

(12) United States Patent
Lee

(10) Patent No.: US 10,078,637 B2
(45) Date of Patent: *Sep. 18, 2018

(54) PROPERTY LIST CUSTOMIZATION

(71) Applicant: EMPIRE TECHNOLOGY DEVELOPMENT LLC, Wilmington, DE (US)

(72) Inventor: Hyoung-Gon Lee, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,178

(22) Filed: Aug. 16, 2016

(65) Prior Publication Data
US 2016/0357760 A1    Dec. 8, 2016

Related U.S. Application Data

(63) Continuation of application No. 13/805,785, filed as application No. PCT/US2012/047959 on Jul. 24, 2012, now Pat. No. 9,471,574.

(51) Int. Cl.
  G06F 17/30    (2006.01)
  H04N 1/32    (2006.01)
  G06Q 50/00    (2012.01)
  H04L 12/58    (2006.01)

(52) U.S. Cl.
  CPC ....... G06F 17/30056 (2013.01); G06Q 50/01 (2013.01); H04L 51/32 (2013.01); H04N 1/32128 (2013.01)

(58) Field of Classification Search
  CPC .......... G06F 17/30867; G06Q 30/0218; G06Q 30/02
  See application file for complete search history.

(56) References Cited

U.S. PATENT DOCUMENTS 6,608,650 B1    8/2003    Torres et al.
7,028,261 B2    4/2006    Smyth et al.
7,831,529 B2    11/2010    Horvitz et al.
(Continued)

FOREIGN PATENT DOCUMENTS

CN    102508846 A    6/2012
CN    102571839 A    7/2012

OTHER PUBLICATIONS

International Search Report and Written Opinion for International Application No. PCT/US12/47959, dated Sep. 28, 2012, pp. 6.

Primary Examiner — Loc Tran

(57) ABSTRACT

Technologies are generally described for customization of a list of properties associated with media files based at least in part on user's preferences. In some examples, a method may include receiving, by a server, a plurality of user inputs that respectively identify the user's designated favorites from among a plurality of media files; determining, by the server, the user's preferences from among a plurality of properties associated with the user's designated favorites from among the plurality of media files, based at least in part on the received user inputs; and providing, by the server, the user with a list of the plurality of properties based at least in part on the user's preferences from among the plurality of properties.

19 Claims, 5 Drawing Sheets

(56) References Cited

U.S. PATENT DOCUMENTS

| | | | |
|---|---|---|---|
| 8,661,096 B2 | 2/2014 | Chou | |
| 8,825,759 B1 | 9/2014 | Jackson et al. | |
| 2002/0030754 A1* | 3/2002 | Sugimoto | H04N 5/23293 |
| | | | 348/333.02 |
| 2005/0108406 A1 | 5/2005 | Lee et al. | |
| 2006/0050140 A1* | 3/2006 | Shin | G11B 27/031 |
| | | | 348/14.02 |
| 2006/0056670 A1 | 3/2006 | Hamadeh | |
| 2006/0218187 A1 | 9/2006 | Plastina et al. | |
| 2008/0052639 A1 | 2/2008 | Chun et al. | |
| 2010/0049852 A1 | 2/2010 | Whitnah et al. | |
| 2011/0028138 A1 | 2/2011 | Davies-Moore et al. | |
| 2011/0029914 A1* | 2/2011 | Whitby | G06T 11/60 |
| | | | 715/781 |
| 2011/0282225 A1 | 11/2011 | Anderson et al. | |
| 2013/0012290 A1* | 1/2013 | Moreno | G07F 17/3295 |
| | | | 463/20 |
| 2015/0153933 A1* | 6/2015 | Filip | G06F 17/30265 |
| | | | 715/838 |

* cited by examiner

PROPERTY LIST CUSTOMIZATION

CROSS-REFERENCE TO RELATED APPLICATIONS

This Application is a continuation application under 35 U.S.C. § 120 of U.S. patent application Ser. No. 13/805,785, filed on Dec. 20, 2012, now U.S. Pat. No. 9,471,574, which is the U.S. National Stage filing under 35 U.S.C. § 371 of International Application No. PCT/US12/47959, filed on Jul. 24, 2012. The disclosures of both International Application No. PCT/US12/47959 and U.S. patent application Ser. No. 13/805,785 are hereby incorporated herein by reference in their entireties.

BACKGROUND

Social network services specialized in photo sharing are widely used worldwide. A user can take a picture using a camera equipped with his/her phone or tablet, apply a digital filter effect or modification to the picture using a photo taking/sharing application or program, and share an embellished picture (i.e., the picture to which the digital filter effect or modification is applied) on a variety of social networking services such as, for example, Facebook®, Twitter®, Instagram®, Flickr®, Tumblr®, Foursquare®, etc.

SUMMARY

In an example, a method may include receiving, by a server, a plurality of user inputs that respectively identify the user's designated favorites from among a plurality of media files; determining, by the server, the user's preferences from among a plurality of properties associated with the user's designated favorites from among the plurality of media files, based at least in part on the received user inputs; and providing, by the server, the user with a list of the plurality of properties based at least in part on the user's preferences from among the plurality of properties.

In another example, a system may include a preference determination unit configured to determine preferences of a user for a plurality of properties associated with a plurality of media files based at least in part on user inputs associated with the plurality of media files, and a property list customization unit configured to determine an order of the plurality of properties to be provided to the user based at least in part on the preferences of the user determined by the preference determination unit.

In yet another example, a computer-readable storage medium may store thereon computer-executable instructions that, in response to execution, cause a server to perform operations, including determining preferences of a user for a plurality of properties associated with a plurality of media files, based at least in part on inputs of the user, and customizing a list of the properties associated with the media files, based at least in part on the determined preferences.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
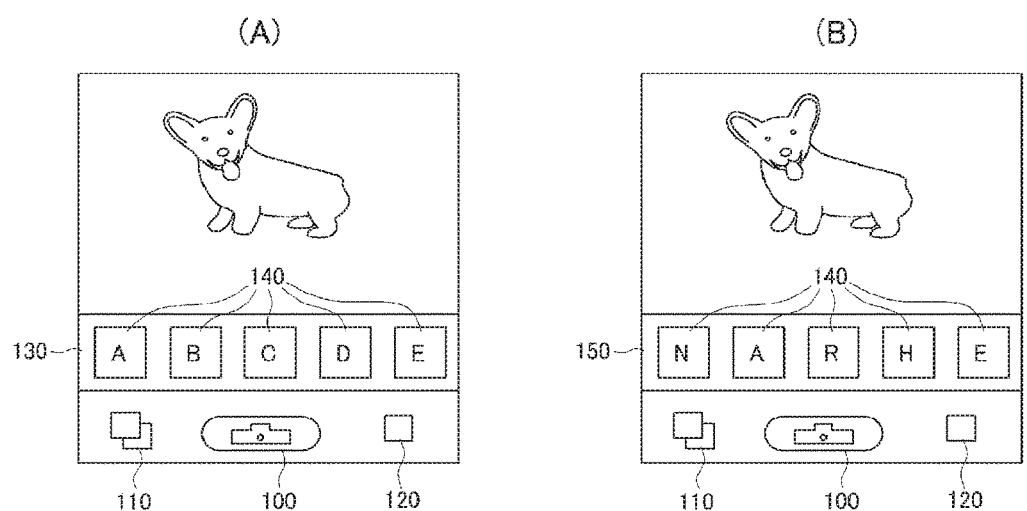
FIGS. 1(A) and 1(B) schematically show illustrative examples of screenshots when running a photo taking/sharing application on an electronic device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a property list customization scheme for a server providing a media file sharing service such as, for example, a photo sharing service.

Technologies are generally described for customization of a list of customizable properties associated with media files, such as image files, based at least in part on a user's preferences. In some examples, a photo sharing service provider may sell or distribute a photo taking/sharing application, which may provide multiple media customizable properties designed to modify digital photographic images by adjusting color, contrast and/or exposure, etc. By way of example, but not limitation, the media customizable properties may include digital filter effects (e.g., Normal, Amaro, Rise, Hudson, X-Pro II, Sierra, Lo-fi, Earlybird, Sutro, Toaster, Brannan, Inkwell, Walden, Hefe, Valencia, Nashville, 1977, and Kelvin provided by Instagram®) and/or modifications (e.g., normal, out-focusing, softening, sharpening, dot, retro comic book, toy camera, add rainbow, color modification, painting, photo combining, frame, insert text, privacy enhance, face replacement, etc.). In some examples, a user may install the photo taking/sharing application on his/her electronic device, and run the application to modify a captured photo using the digital filter effects provided by the application, and/or post the photo on a social networking service (SNS). Also, in some examples, the user may view photos posted by others and express his/her preference for one or more of the photos by clicking or tapping an appropriate interface button for the corresponding photos or leaving comments that are favorable to the corresponding photos.

In some examples, a property list customization system may analyze user inputs identifying the user's designated favorites, and determine preferences of the user for the respective properties. Then, in some examples, the property list customization system may determine an order of the properties to be provided to the user based at least in part on the preferences of the user.

By way of example, but not limitation, it may be assumed that the user has shown his/her interest for 100 photos, among which a first filter effect is applied to 20 photos, a second filter effect is applied to 10 photos, a third filter effect is applied to 15 photos, a fourth filter effect is applied to 50 photos, and a fifth filter effect is applied to 5 photos. In such cases, the property list customization system may determine the preferences of the user for the properties in an order of the fourth filter effect, the first filter effect, the third filter effect, the second filter effect and the fifth filter effect. That is, the user's preferences of media customizable properties may be determined in accordance with the number of occurrences thereof. Then, when the user takes a new photo using the photo taking/sharing application, the property list customization system may provide the user with a list of properties sorted in the order of preferences, i.e., in the order of the fourth filter effect, the first filter effect, the third filter effect, the second filter effect and the fifth filter effect.

In some examples, the property list customization system may determine the preferences of the user for the properties for respective circumstances under which the photos were taken, and determine an order of the properties to be provided to the user based at least in part on the determined preferences for the circumstance similar to a current circumstance under which the user tries to take a new photo. Non-limiting examples of the circumstance may include a location where the photo was taken, whether the photo is a portrait photo or a landscape photo, and so on.

By way of example, but not limitation, it may be assumed that the user has shown his/her interest for 100 photos, and among the 100 photos, 70 photos are landscape photos and 30 photos are portrait photos. In such cases, the property list customization system may determine the user's preferences for landscape photos and for portrait photos, respectively. Then, when the user takes a new landscape photo, the property list customization system may determine the order of the properties to be provided to the user based at least in part on the determined preferences of the user for landscape photos. Similarly, when the user takes a new portrait photo, the property list customization system may determine the order of the properties to be provided to the user based at least in part on the determined preferences of the user for portrait photos.

FIGS. 1(A) and 1(B) schematically show illustrative examples of screenshots when running a photo taking/sharing application on an electronic device, arranged in accordance with at least some embodiments described herein.

As depicted in FIG. 1(A), when a user activates or runs on his/her electronic device a photo taking/sharing application provided by a photo sharing service provider, the photo taking/sharing application may provide a graphical user interface including multiple functional buttons including, but not limited to, a shutter button 100, a photo library button 110 and a property list showing/hiding button 120 on a screen of the electronic device. Examples of the electronic device may include, but are not limited to, a smartphone, a mobile phone, a personal digital assistant (PDA), a tablet, a laptop computer, and any other devices that may have a camera.

In some embodiments, the user may tap shutter button 100 to take a photo. Further, in some embodiments, the user may tap photo library button 110 to view photos stored in a photo library of the electronic device.

In some embodiments, the photo taking/sharing application may be provided by a social networking service (SNS) provider such as, for example, Facebook®, Twitter®, Instagram®, Flickr®, Tumblr®, Foursquare®, etc.—that is, the photo sharing service provider may be the same as or associated with the SNS provider. When the user shows an intention to post a photo on his/her SNS (e.g., by clicking or tapping an appropriate interface button on the SNS), the SNS may provide the graphical user interface including the multiple functional buttons by running the photo taking/sharing application on the electronic device. In such cases, the user may tap shutter button 100 to take a new photo to post on the SNS; or tap photo library button 110 to view the photos stored in the photo library, and select and post at least one of the stored photos.

In some embodiments, the user may tap property list showing/hiding button 120 to toggle between showing and hiding of a list 130 of media customizable properties provided by the photo taking/sharing application. By way of example, but not limitation, the properties provided by the photo taking/sharing application may include at least one of filter effects (e.g., Normal, Amaro, Rise, Hudson, X-Pro II, Sierra, Lo-fi, Earlybird, Sutro, Toaster, Brannan, Inkwell, Walden, Hefe, Valencia, Nashville, 1977, and Kelvin provided by Instagram®) and modifications (e.g., normal, out-focusing, softening, sharpening, dot, retro comic book, toy camera, add rainbow, color modification, painting, photo combining, frame, insert text, privacy enhance, face replacement, etc.) applicable to photos.

In some embodiments, when the user taps property list showing/hiding button 120 to show list 130, multiple property buttons 140 may be displayed on the screen. In some embodiments, property buttons 140 may be presented in a default order preset by the photo sharing service provider. Then, the user may scroll between property buttons 140 to select one of the properties he/she wants to apply to a photo.

In some embodiments, when the user taps property list showing/hiding button 120, the electronic device may display on the screen a customized list 150 as depicted in FIG. 1(B). In customized list 150, property buttons 140 may be presented in an order determined based at least in part on the user's preferences for the respective properties. Customized list 150 may reduce or eliminate the need to scroll between different property buttons 140 to find or locate the user's favorite properties, so that the user may easily access one of the properties he/she wants to apply to a photo.

In some embodiments, a property list customization system may determine the user's preferences for the respective media customizable properties based at least in part on the user's activities on the social networking service (SNS). In some embodiments, the SNS provider may provide the property list customization system with information regarding the user's activities. In some embodiments, the property list customization system may monitor the user's activities on the SNS.

By way of example, but not limitation, it may be assumed that the user has four (4) friends in the SNS, e.g., Friends 1-4, and has shown his/her interest in 5 of 100 photos of Friend 1, 5 of 150 photos of Friend 2, 15 of 200 photos of Friend 3, and 10 of 150 photos of Friend 4. Further, it may be assumed that the photo taking/sharing application provides twenty-six (26) filter effects, e.g., FE A to FE Z. Although it is illustrated in the example that the user has four friends in the SNS and the photo taking/sharing application provides twenty-six filter effects, one skilled in the art will appreciate that the user may have any number of friends, and the photo taking/sharing application may provide any number of filter effects.

Table 1 below illustrates an example list of photos being favored by the user. The list below also contains information regarding the filter effects applied to the corresponding photos.

TABLE 1

| ID of Photo | Applied Filter Effect |
|---|---|
| Photo #01 of Friend 1 | FE N |
| Photo #02 of Friend 1 | FE A |
| Photo #03 of Friend 1 | FE R |
| Photo #04 of Friend 1 | FE N |
| Photo #05 of Friend 1 | FE A |
| Photo #01 of Friend 2 | FE N |
| Photo #02 of Friend 2 | FE N |
| Photo #03 of Friend 2 | FE A |
| Photo #04 of Friend 2 | FE N |
| Photo #05 of Friend 2 | FE R |
| Photo #01 of Friend 3 | FE N |
| Photo #02 of Friend 3 | FE N |
| Photo #03 of Friend 3 | FE R |
| Photo #04 of Friend 3 | FE R |
| Photo #05 of Friend 3 | FE N |
| Photo #06 of Friend 3 | FE N |
| Photo #07 of Friend 3 | FE N |
| Photo #08 of Friend 3 | FE H |
| Photo #09 of Friend 3 | FE A |
| Photo #10 of Friend 3 | FE N |
| Photo #11 of Friend 3 | FE H |
| Photo #12 of Friend 3 | FE N |
| Photo #13 of Friend 3 | FE Z |
| Photo #14 of Friend 3 | FE E |
| Photo #15 of Friend 3 | FE A |
| Photo #01 of Friend 4 | FE E |
| Photo #02 of Friend 4 | FE N |
| Photo #03 of Friend 4 | FE Y |
| Photo #04 of Friend 4 | FE R |
| Photo #05 of Friend 4 | FE X |
| Photo #06 of Friend 4 | FE A |
| Photo #07 of Friend 4 | FE A |
| Photo #08 of Friend 4 | FE A |
| Photo #09 of Friend 4 | FE H |
| Photo #10 of Friend 4 | FE A |

In some embodiments, the property list customization system may determine the user's preferences for the respective filter effects, based at least in part on a number of photos being favored by the user. Table 2 below illustrates the number of user inputs identifying the user's interests for the photos associated with the respective filter effects, which may indicate the user's preferences for the respective filter effects.

TABLE 2

| Filter Effect | Number of User Inputs (Preference) |
|---|---|
| FE N | 13 |
| FE A | 9 |
| FE R | 5 |
| FE H | 3 |
| FE E | 2 |
| FE X | 1 |
| FE Y | 1 |
| FE Z | 1 |

In such cases, the property list customization system may determine an order of filter effects to be provided to the user as FE N, FE A, FE R, FE H, FE E, FE X, FE Y, FE Z, and others, as illustrated in FIG. 1(B).

In some embodiments, the preferences for some of the filter effects may be identical, as the number of preferences for FE X, FE Y and FE Z are same in the above example. In such cases, the property list customization system may determine the order for the filter effects with the same preference in accordance with the default order preset by the photo sharing service provider, with reference to preferences of the user's friends, or with reference to a random criterion.

In some embodiments, the property list customization system may determine the user's preferences for the filter effects for respective circumstances under which the photos were taken, and determine the order of filter effects to be provided to the electronic device based at least in part on a current circumstance under which the user takes a photo or activates the photo taking/sharing application. By way of example, but not limitation, the circumstance under which each of the photos was taken may include a location where the corresponding photo was taken, whether the corresponding photo is a portrait photo or a landscape photo, and so on.

Table 3 below illustrates an example list of photos being favored by the user, with the filter effects applied to the corresponding photos and the locations at which the corresponding photos were taken.

TABLE 3

| ID of Photo | Applied Filter Effect | Photo Taken Location |
|---|---|---|
| Photo #01 of Friend 1 | FE N | Office |
| Photo #02 of Friend 1 | FE A | Home |
| Photo #03 of Friend 1 | FE R | Home |
| Photo #04 of Friend 1 | FE N | Crowded |
| Photo #05 of Friend 1 | FE A | Crowded |
| Photo #01 of Friend 2 | FE N | Crowded |
| Photo #02 of Friend 2 | FE N | Office |
| Photo #03 of Friend 2 | FE A | Office |
| Photo #04 of Friend 2 | FE N | Home |
| Photo #05 of Friend 2 | FE R | Crowded |
| Photo #01 of Friend 3 | FE N | Office |
| Photo #02 of Friend 3 | FE N | Home |
| Photo #03 of Friend 3 | FE R | Crowded |
| Photo #04 of Friend 3 | FE R | Crowded |
| Photo #05 of Friend 3 | FE N | Crowded |
| Photo #06 of Friend 3 | FE N | Crowded |
| Photo #07 of Friend 3 | FE N | Office |
| Photo #08 of Friend 3 | FE H | Office |
| Photo #09 of Friend 3 | FE A | Outdoor |
| Photo #10 of Friend 3 | FE N | Outdoor |
| Photo #11 of Friend 3 | FE H | Outdoor |
| Photo #12 of Friend 3 | FE N | Crowded |
| Photo #13 of Friend 3 | FE Z | Outdoor |
| Photo #14 of Friend 3 | FE E | Office |
| Photo #15 of Friend 3 | FE A | Home |
| Photo #01 of Friend 4 | FE E | Home |
| Photo #02 of Friend 4 | FE N | Outdoor |
| Photo #03 of Friend 4 | FE Y | Office |
| Photo #04 of Friend 4 | FE R | Crowded |

TABLE 3-continued

| ID of Photo | Applied Filter Effect | Photo Taken Location |
| --- | --- | --- |
| Photo #05 of Friend 4 | FE X | Office |
| Photo #06 of Friend 4 | FE A | Office |
| Photo #07 of Friend 4 | FE A | Home |
| Photo #08 of Friend 4 | FE A | Home |
| Photo #09 of Friend 4 | FE H | Crowded |
| Photo #10 of Friend 4 | FE A | Outdoor |

In such cases, when the user takes a photo at a crowded location, for example, the property list customization system may determine the user's preferences for the filter effects for the crowded locations. Also, the property list customization system may determine the user's preferences based at least in part on the number of user inputs identifying the user's interests for the photos associated with the respective filter effects, as in Table 4 below.

TABLE 4

| Filter Effect | Number of User Inputs (Preference) |
| --- | --- |
| FE N | 5 |
| FE R | 4 |
| FE A | 1 |
| FE H | 1 |

Then, the property list customization system may determine an order of filter effects to be provided to the user at the crowded location as FE N, FE R, FE A, FE H, and others; or FE N, FE R, FE H, FE A, and others.

Figure 2:
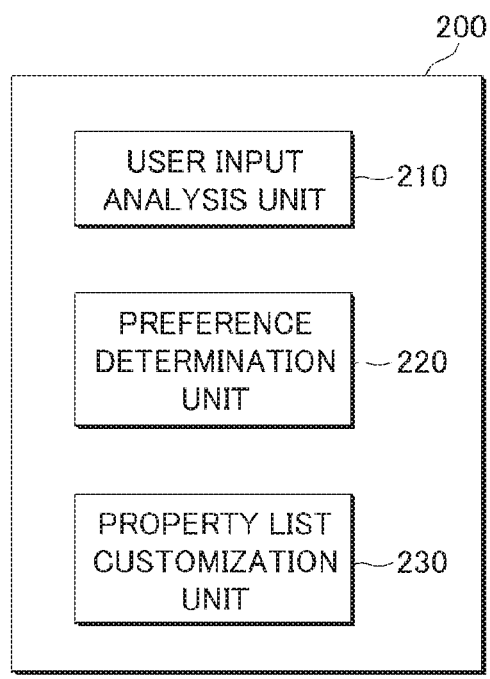
FIG. 2 shows a schematic block diagram illustrating an example architecture of a property list customization system for providing a property list customization scheme for a server, arranged in accordance with at least some embodiments described herein.

FIG. 2 shows a schematic block diagram illustrating an example architecture of a property list customization system for providing a property list customization scheme for a server, arranged in accordance with at least some embodiments described herein.

As depicted, a property list customization system 200 may include a user input analysis unit 210, a preference determination unit 220, and a property list customization unit 230. Although illustrated as discrete components, various components may be divided into additional components, combined into fewer components, or eliminated altogether while being contemplated within the scope of the disclosed subject matter. Those skilled in the art will recognize that property list customization system 200 may be a component of a server of a photo sharing service or social network service provider or be separate from but still controlled by the server. Those skilled in the art will also recognize that each component of property list customization system 200 may be controlled by one or more segments of a server farm or a server cluster. In such cases, the respective components may be controlled by the same segments or different segments, depending on the desired implementation.

User input analysis unit 210 may be configured to analyze a user's inputs associated with multiple image files such as photos posted on an SNS, and determine whether each of the inputs indicates the corresponding image file as being favored by the user. By way of example, but not limitation, the user input indicating the image file being favored by the user may include at least one of the user's tapping or clicking an appropriate button on a corresponding user interface and the user's favorable comments for the corresponding image file.

Preference determination unit 220 may be configured to determine the user's preferences for multiple media customizable properties associated with the image files based at least in part on the user's inputs analyzed by user input analysis unit 210. By way of example, but not limitation, the properties may include at least one of filter effects and modifications applied to the image files. In some embodiments, preference determination unit 220 may be configured to count a number of user inputs indicating respective ones of the image files being favored with which the respective properties are associated, and determine the preferences of the user for the respective properties based at least in part on the number of user inputs.

Property list customization unit 230 may be configured to determine an order of the multiple properties to be provided to the user based at least in part on the user's preferences determined by preference determination unit 220.

In some embodiments, preference determination unit 220 may determine the user's preferences for the properties corresponding to respective circumstances under which the image files were taken or captured. Then, property list customization unit 230 may determine an order of the multiple properties to be provided to the user based at least in part on the determined preferences for the circumstance similar to a current circumstance under which the user takes or captures a new image file. By way of example, but not limitation, the circumstance under which each of the image files was taken or captured may include at least one of a location where the corresponding image file was taken or captured, whether the corresponding image file is a portrait photo, and whether the corresponding image file is a landscape photo.

As such, property list customization system 200 may allow the user to easily access one of the multiple properties he/she wants to apply to a photo, by saving the user effort to scroll between a bunch of property buttons to find or locate his/her favorite properties.

Although FIG. 2 describes the embodiments with regard to the customization of the property list associated with image files (e.g., photos), it should be appreciated by one skilled in the art that a list of properties associated with any other media files such as, for example, video files and audio files, may also be customized by making variations to the disclosed embodiments without departing from the spirit or scope of the subject matter presented herein.

Figure 3:
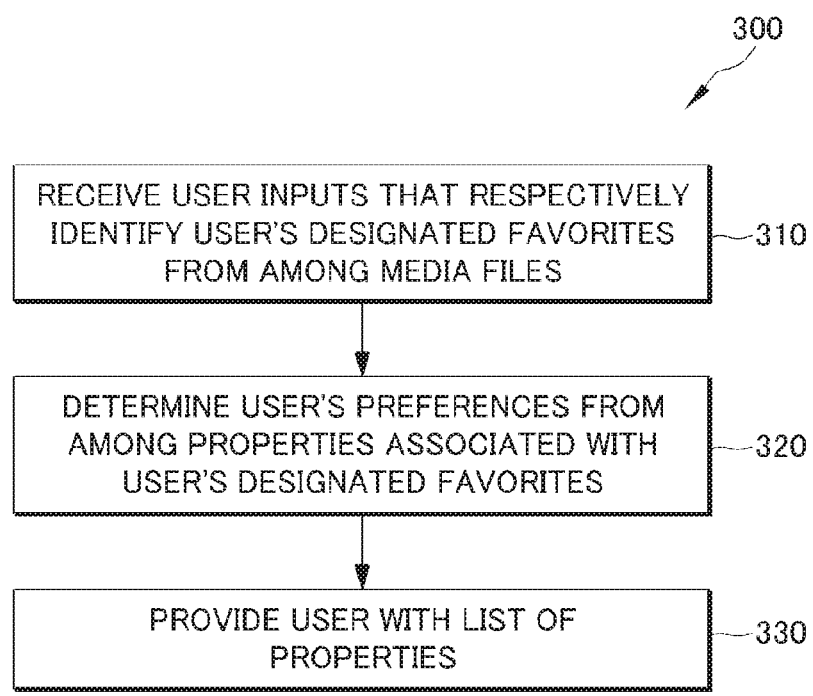
FIG. 3 shows an example flow diagram of a process for providing a property list customization scheme for a server, arranged in accordance with at least some embodiments described herein.

FIG. 3 shows an example flow diagram of a process for providing a property list customization scheme for a server, arranged in accordance with at least some embodiments described herein.

The process in FIG. 3 may be implemented on or at a server or a property list customization system such as property list customization system 200 described above, which may be a component of the server or separate from but controlled by the server. An example process 300 may include one or more operations, actions, or functions as illustrated by one or more blocks 310, 320 and/or 330. Although illustrated as discrete blocks, various blocks may be divided into additional blocks, combined into fewer blocks, or eliminated, depending on the desired implementation. Processing may begin at block 310.

At block 310 (Receive User Inputs that Respectively Identify User's Designated Favorites from among Media Files), the server or the property list customization system may receive multiple user inputs that respectively identify the user's designated favorites from among multiple media files. By way of example, but not limitation, the user inputs that respectively identify the user's designated favorites from among the multiple media files include at least one of the user's tapping or clicking of an appropriate user interface button and the user's posting favorable comments for the corresponding media files. Processing may continue from block 310 to block 320.

At block 320 (Determine User's Preferences from among Properties Associated with User's Designated Favorites), the server or the property list customization system may determine the user's preferences from among multiple properties associated with the user's designated favorites from among the multiple media files, based at least in part on the user inputs. By way of example, but not limitation, the media files may include image files such as photos, and the properties may include at least one of filter effects and modifications applied to the image files.

In some embodiments, the server or the property list customization system may count a number of user inputs identifying the user's designated favorites from among the multiple media files with which a corresponding one of the multiple properties is associated, for each of the properties. Then, the server or the property list customization system may determine the user's preference for each of the properties based at least in part on the number of the user inputs identifying the user's designated favorites from among the multiple media files with which the corresponding one of the multiple properties is associated.

In some embodiments, the server or the property list customization system may determine the user's preferences for a respective one of the multiple properties, for respective circumstances under which the media files were made. Processing may continue from block 320 to block 330.

At block 330 (Provide User with List of Properties), the server or the property list customization system may provide the user with a customized list of the properties based at least in part on the user's preferences. In some embodiments, the server or the property list customization system may detect a current circumstance for creating a new media file and provide the user with the customized list based at least in part on the preferences for the circumstance similar to the current circumstance.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
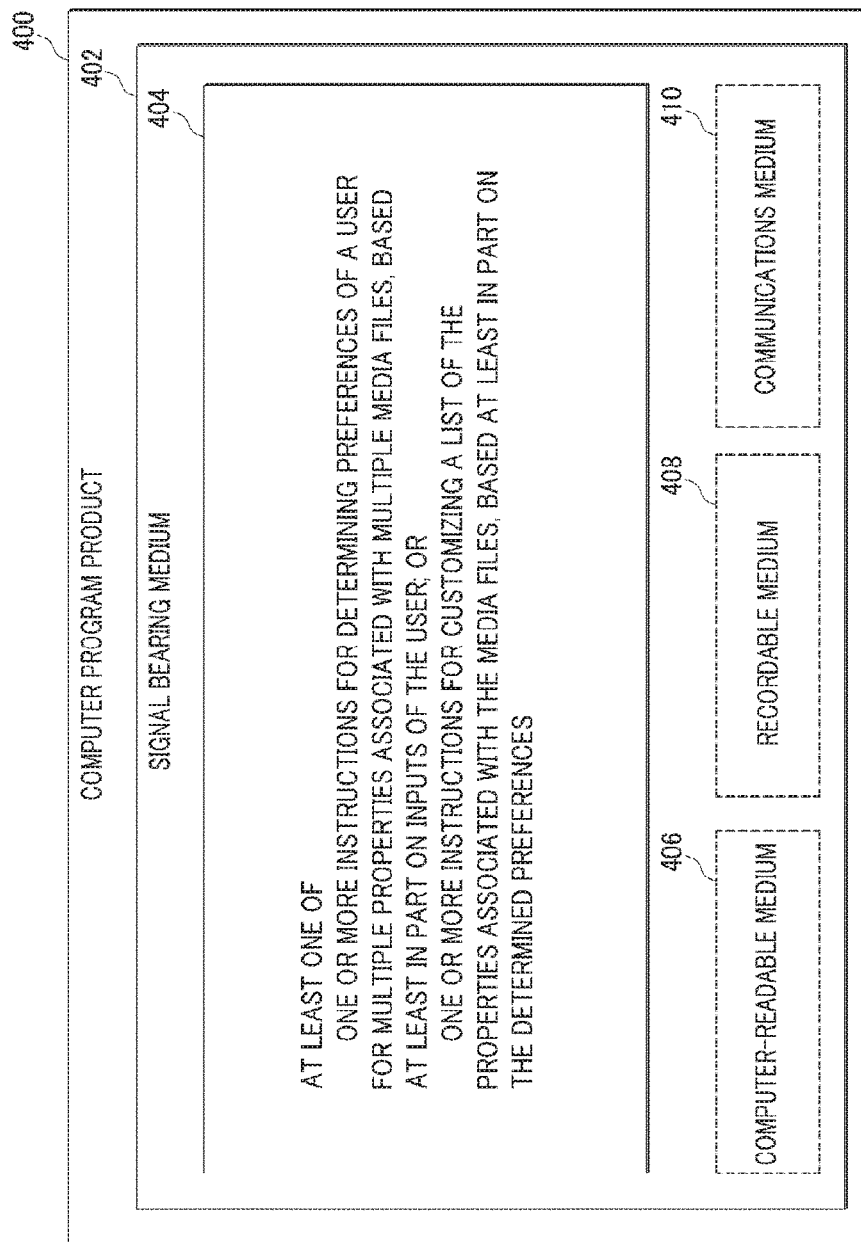
FIG. 4 illustrates an example computer program product that may be utilized to provide a property list customization scheme, arranged in accordance with at least some embodiments described herein.

FIG. 4 illustrates an example computer program product that may be utilized to provide a property list customization scheme, arranged in accordance with at least some embodiments described herein.

Computer program product 400 may include a signal bearing medium 402. Signal bearing medium 402 may include one or more instructions 404 that, when executed by, for example, a processor, may provide the functionality described above with respect to FIGS. 1-3. By way of example, instructions 404 may include: one or more instructions for determining preferences of a user for multiple properties associated with multiple media files, based at least in part on inputs of the user; or one or more instructions for customizing a list of the properties associated with the media files, based at least in part on the determined preferences. Thus, for example, referring to FIG. 2, property list customization system 200 may undertake one or more of the blocks shown in FIG. 3 in response to instructions 404.

In some implementations, signal bearing medium 402 may encompass a computer-readable medium 406, such as, but not limited to, a hard disk drive, a CD, a DVD, a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, computer program product 400 may be conveyed to one or more modules of property list customization system 200 by an RF signal bearing medium 402, where the signal bearing medium 402 is conveyed by a wireless communications medium 410 (e.g., a wireless communications medium conforming with the IEEE 802.11 standard).

Figure 5:
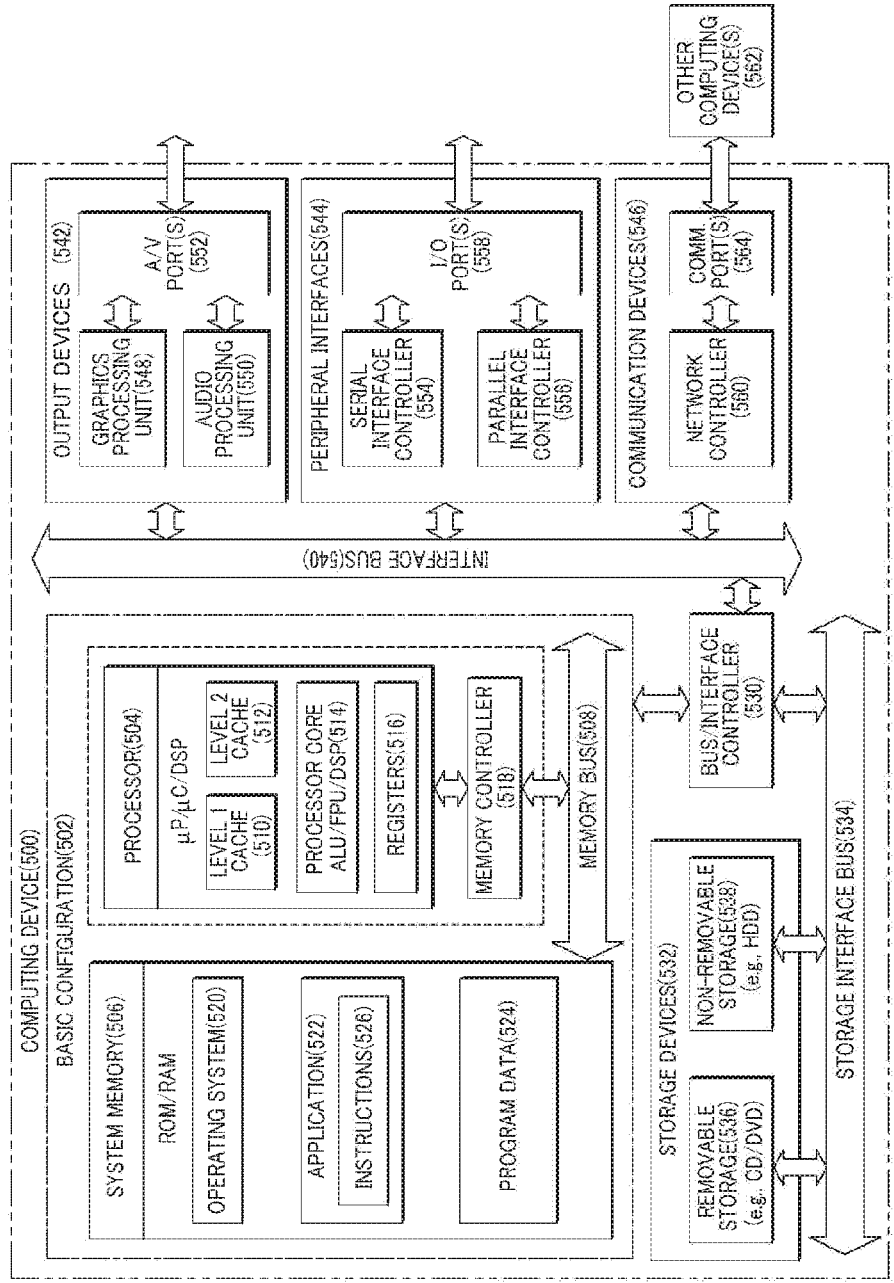
FIG. 5 is a block diagram illustrating an example computing device that may be utilized to provide a property list customization scheme, arranged in accordance with at least some embodiments described herein.

FIG. 5 is a block diagram illustrating an example computing device that may be utilized to provide a property list customization scheme, arranged in accordance with at least some embodiments described herein.

In these examples, elements of a computing device 500 may be arranged or configured for a server. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include instructions 526 that may be arranged to perform the functions as described herein including the actions described with respect to the property list customization system 200 architecture as shown in FIG. 2 or including the actions described with respect to the flow charts shown in FIG. 3. In some examples, application 522 may be arranged to operate with program data 524 on an operating system 520 such that implementations for instructions for an electronic device as described herein.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method to provide a customized list of selectable properties associated with media files, the method comprising:
    determining, by a server, user preferred properties from among a plurality of properties associated with media files favored by a user, wherein the determining the user preferred properties includes:
    identifying the media files, favored by the user, from among a plurality of media files posted on a social networking service (SNS), wherein the identifying the media files is based on the user's inputs, received via the SNS, that respectively indicate the media files favored by the user;
    identifying the plurality of properties which are applied to the media files favored by the user;
    counting a usage frequency of each of the plurality of properties applied to the media files favored by the user, wherein the counting the usage frequency of each of the plurality of properties applied to the media files, favored by the user, includes counting a usage frequency of each of the plurality of properties applied to one or more media files posted by another user on the SNS, and wherein the one or more media files are favored by the user; and
    prioritizing, based on the usage frequency, the plurality of properties applied to the media files favored by the user;
    receiving, by the server, from the user's electronic device, an indication of an activation of a media file creation or sharing application; and
    in response to the receiving the indication and based at least, in part, on the user preferred properties from among the plurality of properties, providing, by the server to the user's electronic device, the customized list of selectable properties for the user,
    wherein the selectable properties in the customized list are presented as prioritized.

2. The method of claim 1, wherein the media files include photos, and wherein the selectable properties include digital filter effects including one or more of: Normal, Amaro, Rise, Hudson, X-Pro II, Sierra, Lo-fi, Earlybird, Sutro, Toaster, Brannan, InkWell, Walden, Hefe, Valencia, Nashville, 1977, or Kelvin, or modifications including one or more of: normal, out out-focusing, softening, sharpening, dot, retro comic book, toy camera, add rainbow, color modification, painting, photo combining, frame, insert text, privacy enhance, or face replacement.

3. The method of claim 1, wherein the media files include video files or audio files.

4. The method of claim 1, wherein the receiving the indication of the activation of the media file creation or sharing application includes receiving an indication of a media file creation or sharing application provided by a SNS provider.

5. The method of claim 1, wherein the counting the usage frequency of each of the plurality of properties applied to the media files favored by the user includes:
    counting a respective number of media files, favored by the user, from a respective plurality of media files posted by a plurality of other users on the SNS; and
    counting a usage frequency of each of the plurality of properties applied to the respective number of media files.

6. The method of claim 1, wherein the determining the user preferred properties from among the plurality of properties associated with the media files favored by the user further includes:
    detecting a current circumstance under which a current media file is created; and
    comparing the current circumstance under which the current media file is created with a respective circumstance under which each of the media files, favored by the user, is created,
    wherein the prioritizing the plurality of properties applied to the media files, favored by the user, is based on similarities between the current circumstance and each of the respective circumstance.

7. The method of claim 6, wherein the detecting the current circumstance under which the current media file is created includes determining a location where the current media file is created, or determining whether the current media file includes a portrait photo or a landscape photo.

8. The method of claim 1, wherein the user's inputs, received via the SNS, that respectively indicate the media files, favored by the user, include at least one of a tapping or clicking of a favoring button on a user interface provided by the SNS or a posting of favorable comments for the corresponding media files.

9. A property list customization system, comprising:
    one or more processors, wherein the one or more processors are configured to perform or cause to be performed:
    identify media files, favored by a user, from among a plurality of media files posted on a social networking service (SNS), wherein the identification is based on the user's inputs, received via the SNS, that respectively indicate that a corresponding one of the plurality of media files is at least one of the media files favored by the user;

identify a plurality of properties applied to the media files favored by the user;

count a usage frequency of each of the plurality of properties applied to the media files favored by the user;

determine respective circumstances under which each of the media files favored by the user is created;

prioritize, based on the usage frequency and the respective circumstances, the plurality of properties applied to the media files favored by the user;

receive, from the user's electronic device, an indication of an activation of a media file creation or sharing application; and in response to the receipt of the indication, provide, to the user's electronic device the prioritized plurality of properties as a list of selectable properties, wherein the list includes the prioritized plurality of properties in a particular order.

10. The property list customization system of claim 9, wherein the property list customization system is controlled by a server associated with a SNS provider.

11. The property list customization system of claim 9, wherein the user's electronic device includes a smartphone, a mobile phone, a personal digital assistant (PDA), a tablet, or a laptop computer.

12. The property list customization system of claim 9, wherein the media files include photos, and wherein the selectable properties include digital filter effects including one or more of: Normal, Amaro, Rise, Hudson, X-Pro II, Sierra, Lo-fi, Earlybird, Sutro, Toaster, Brannan, InkWell, Walden, Hefe, Valencia, Nashville, 1977, or Kelvin, or modifications including one or more of: normal, out-focusing, softening, sharpening, dot, retro comic book, toy camera, add rainbow, color modification, painting, photo combining, frame, insert text, privacy enhance, or face replacement.

13. The property list customization system of claim 9, wherein the media files include video files or audio files.

14. The property list customization system of claim 9, wherein the prioritized plurality of properties in the particular order includes corresponding selectable property buttons displayed in the particular order.

15. The property list customization system of claim 9, wherein the user's inputs, received via the SNS, that respectively indicate the media files favored by the user include at least one of the a tapping or clicking of a favoring button on a user interface provided by the SNS or posting of favorable comments for the corresponding media files.

16. A non-transitory computer-readable storage medium having stored thereon, computer-executable instructions that, in response to execution, cause at least one processor to perform or control performance of operations, comprising:

determine user preferred properties from among a plurality of properties associated with media files favored by a user, wherein the determination of the user preferred properties includes:

identification of the media files, favored by the user, from among a plurality of media files posted on a social networking service (SNS), wherein the identification of the media files is based on the user's inputs, received via the SNS, that respectively indicate the media files favored by the user;

identification of the plurality of properties applied to the media files favored by the user;

count of a usage frequency of each of the plurality of properties applied to the media files favored by the user;

determination of respective circumstances under which each of the media files favored by the user is created;

wherein the determination of the respective circumstances includes at least one of:

determination of a respective location at which each of the media files is created; and determination of whether each of the media files include a portrait photo or a landscape photo; and prioritization, based on the usage frequency and the respective circumstances, of the plurality of properties applied to the media files favored by the user;

identification of an indication, received from the user's electronic device, of an activation of a media file creation or sharing application; and in response to the receipt of the indication, provide, to the user's electronic device and based on the user preferred properties from among the plurality of properties, a customized list of selectable properties for the user, wherein the selectable properties in the customized list are presented as prioritized.

17. The non-transitory computer-readable storage medium of claim 16, wherein the media files include photos, and wherein the selectable properties include digital filter effects including one or more of: Normal, Amaro, Rise, Hudson, X-Pro II, Sierra, Lo-fi, Early bird, Sutro, Toaster, Brannan, InkWell, Walden, Hefe, Valencia, Nashville, 1977, or Kelvin, or modifications including one or more of: normal, out-focusing, softening, sharpening, dot, retro comic book, toy camera, add rainbow, color modification, painting, photo combining, frame, insert text, privacy enhance, or face replacement.

18. The non-transitory computer-readable storage medium of claim 16, wherein the media files include video files or audio files.

19. The non-transitory computer-readable storage medium of claim 16, wherein the media file creation or sharing application is provided by a SNS provider.

* * * * *